(12) United States Patent
Fu et al.

(10) Patent No.: US 12,555,581 B2
(45) Date of Patent: Feb. 17, 2026

(54) SYSTEMS AND METHODS FOR LIVE SUMMARIZATION

(71) Applicant: Otter.ai, Inc., Mountain View, CA (US)

(72) Inventors: Yun Fu, Cupertino, CA (US); Richard B. Tasker, Sunnyvale, CA (US); Shivum Agarwal, Palo Alto, CA (US); Neal Granger, Victoria (CA); Gregory K. Sell, Bremerton, WA (US); Tao Xing, San Jose, CA (US); Sam S. Liang, Palo Alto, CA (US)

(73) Assignee: Otter.ai, Inc., Mountain View, CA (US)

( * ) Notice: Subject to any disclaimer, the term of this patent is extended or adjusted under 35 U.S.C. 154(b) by 0 days.

(21) Appl. No.: 18/673,235

(22) Filed: May 23, 2024

(65) Prior Publication Data

US 2024/0395254 A1    Nov. 28, 2024

Related U.S. Application Data

(60) Provisional application No. 63/468,658, filed on May 24, 2023.

(51) Int. Cl.
*G10L 15/26* (2006.01)
*G10L 15/04* (2013.01)

(52) U.S. Cl.
CPC .............. *G10L 15/26* (2013.01); *G10L 15/04* (2013.01)

(58) Field of Classification Search
None
See application file for complete search history.

(56) References Cited

U.S. PATENT DOCUMENTS

| | | |
|---|---|---|
| 6,088,669 A | 7/2000 | Maes |
| 6,363,352 B1 | 3/2002 | Dailey et al. |
| | (Continued) | |

FOREIGN PATENT DOCUMENTS

| | | |
|---|---|---|
| CN | 111164676 | 5/2020 |
| JP | 3376487 | 5/2001 |
| | (Continued) | |

OTHER PUBLICATIONS

Basu et al., "An Overview of Speaker Diarization: Approaches, Resources and Challenges," 2016 Conference of The Oriental Chapter of International Committee for Coordination and Standardization of Speechx Databases and Assessment Technique (O-COCOSDA), Bali, Indonesia, Oct. 26-28, 2016.

(Continued)

*Primary Examiner* — Neeraj Sharma
(74) *Attorney, Agent, or Firm* — Faegre Drinker Biddle & Reath LLP

(57) ABSTRACT

Method, system, device, and non-transitory computer-readable medium for generating summaries. In some embodiments, the method includes: obtaining a first set of audio data associated with the meeting while the meeting occurs; transcribing the first set of audio data into a first set of text data while the meeting occurs; generating a first version of a live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data.

20 Claims, 5 Drawing Sheets

(56) References Cited

U.S. PATENT DOCUMENTS

| | | |
|---|---|---|
| 6,434,520 B1 | 8/2002 | Kanevsky et al. |
| 6,513,003 B1 | 1/2003 | Angell et al. |
| 8,407,049 B2 | 3/2013 | Cromack et al. |
| 8,612,211 B1 | 12/2013 | Shires et al. |
| 8,645,138 B1 | 2/2014 | Weinstein |
| 8,818,803 B2 * | 8/2014 | Weber ................ G06F 16/7844 |
| | | 386/231 |
| 9,311,932 B2 | 4/2016 | Carter |
| 9,443,518 B1 | 9/2016 | Gauci |
| 9,571,652 B1 | 2/2017 | Zeppenfeld et al. |
| 10,339,918 B2 | 7/2019 | Hofer et al. |
| 10,388,272 B1 | 8/2019 | Thomson et al. |
| 10,573,312 B1 | 2/2020 | Thomson et al. |
| 10,616,278 B1 | 4/2020 | Johansson et al. |
| 10,630,733 B2 | 4/2020 | Modai et al. |
| 10,978,073 B1 | 4/2021 | Fu et al. |
| 11,012,575 B1 | 5/2021 | Leblang et al. |
| 11,017,778 B1 | 5/2021 | Thomson et al. |
| 11,024,316 B1 | 6/2021 | Fu et al. |
| 11,100,943 B1 | 8/2021 | Fu et al. |
| 11,222,185 B2 | 1/2022 | Waibel et al. |
| 11,330,229 B1 * | 5/2022 | Crumley ............ H04N 21/2187 |
| 11,330,299 B2 | 5/2022 | Huo |
| 11,423,911 B1 | 8/2022 | Fu et al. |
| 11,431,517 B1 | 8/2022 | Lau et al. |
| 11,657,822 B2 | 5/2023 | Fu et al. |
| 11,676,623 B1 | 6/2023 | Younes et al. |
| 11,869,508 B2 | 1/2024 | Fu et al. |
| 12,020,722 B2 | 6/2024 | Fu et al. |
| 12,080,299 B2 | 9/2024 | Lau et al. |
| 12,182,502 B1 | 12/2024 | Nakajima et al. |
| 2002/0099552 A1 | 7/2002 | Rubin et al. |
| 2004/0107256 A1 | 6/2004 | Odenwald et al. |
| 2004/0117446 A1 | 6/2004 | Swanson |
| 2005/0034079 A1 | 2/2005 | Gunasekar et al. |
| 2005/0152523 A1 | 7/2005 | Fellenstein et al. |
| 2006/0149558 A1 | 7/2006 | Kahn et al. |
| 2006/0182249 A1 | 8/2006 | Archambault et al. |
| 2007/0071206 A1 | 3/2007 | Gainsboro et al. |
| 2007/0106724 A1 | 5/2007 | Gorti et al. |
| 2007/0118374 A1 | 5/2007 | Wise et al. |
| 2007/0183458 A1 | 8/2007 | Bouazizi et al. |
| 2008/0181417 A1 | 7/2008 | Pereg et al. |
| 2008/0293443 A1 | 11/2008 | Pettinato |
| 2008/0294434 A1 | 11/2008 | Pettinato |
| 2008/0300872 A1 | 12/2008 | Basu et al. |
| 2009/0019367 A1 | 1/2009 | Cavagnari et al. |
| 2009/0030680 A1 | 1/2009 | Mamou |
| 2009/0210391 A1 | 8/2009 | Hall et al. |
| 2009/0240488 A1 | 9/2009 | White et al. |
| 2009/0306981 A1 | 12/2009 | Cromack et al. |
| 2009/0307189 A1 | 12/2009 | Bobbitt et al. |
| 2010/0146438 A1 | 6/2010 | Bush et al. |
| 2011/0228922 A1 | 9/2011 | Dhara et al. |
| 2011/0307241 A1 | 12/2011 | Waibel et al. |
| 2011/0320197 A1 | 12/2011 | Conejero et al. |
| 2012/0046936 A1 | 2/2012 | Kandekar et al. |
| 2012/0253805 A1 | 10/2012 | Rajakumar et al. |
| 2012/0275761 A1 | 11/2012 | Li et al. |
| 2012/0281921 A1 | 11/2012 | Dowell |
| 2012/0310644 A1 | 12/2012 | Zimmerman et al. |
| 2012/0323575 A1 | 12/2012 | Gibbon et al. |
| 2012/0324355 A1 | 12/2012 | Mbenkum et al. |
| 2013/0144603 A1 | 6/2013 | Lord et al. |
| 2013/0300939 A1 | 11/2013 | Chou et al. |
| 2013/0311177 A1 | 11/2013 | Bastide et al. |
| 2013/0346077 A1 | 12/2013 | Mengibar et al. |
| 2014/0029757 A1 | 1/2014 | Aronowitz et al. |
| 2014/0134576 A1 | 5/2014 | Edge |
| 2014/0136999 A1 | 5/2014 | Leibovich et al. |
| 2014/0207449 A1 | 7/2014 | Johnson |
| 2015/0012844 A1 | 1/2015 | Paulik et al. |
| 2015/0206544 A1 | 7/2015 | Carter |
| 2015/0249747 A1 | 9/2015 | Box et al. |
| 2015/0255068 A1 | 9/2015 | Kim et al. |
| 2015/0310863 A1 | 10/2015 | Chen et al. |
| 2016/0004732 A1 | 1/2016 | Hsu et al. |
| 2016/0014222 A1 | 1/2016 | Chen et al. |
| 2016/0284354 A1 | 9/2016 | Chen et al. |
| 2016/0322049 A1 | 11/2016 | Bakshi et al. |
| 2017/0068423 A1 | 3/2017 | Napolitano |
| 2017/0068670 A1 | 3/2017 | Orr |
| 2017/0070706 A1 | 3/2017 | Ursin et al. |
| 2017/0169816 A1 | 6/2017 | Blandin et al. |
| 2017/0180780 A1 | 6/2017 | Jeffries |
| 2017/0199934 A1 * | 7/2017 | Nongpiur .............. G06F 16/638 |
| 2017/0294184 A1 | 10/2017 | Bradley |
| 2017/0301037 A1 | 10/2017 | Baughman et al. |
| 2017/0329943 A1 | 11/2017 | Choi et al. |
| 2017/0372693 A1 | 12/2017 | Rangarajan Sridhar et al. |
| 2018/0007060 A1 | 1/2018 | Leblang et al. |
| 2018/0012598 A1 * | 1/2018 | Thirukovalluru ....... G10L 15/26 |
| 2018/0032226 A1 | 2/2018 | Ryu et al. |
| 2018/0061083 A1 | 3/2018 | Suzuki et al. |
| 2018/0143956 A1 | 5/2018 | Skarbovsky et al. |
| 2018/0174108 A1 | 6/2018 | Kang et al. |
| 2018/0197548 A1 | 7/2018 | Palakodety et al. |
| 2018/0315428 A1 | 11/2018 | Johnson et al. |
| 2018/0316893 A1 | 11/2018 | Rosenberg et al. |
| 2019/0073640 A1 | 3/2019 | Odezue et al. |
| 2019/0273767 A1 | 9/2019 | Nelson et al. |
| 2019/0341050 A1 | 11/2019 | Diamant et al. |
| 2019/0364009 A1 | 11/2019 | Joseph et al. |
| 2020/0051582 A1 | 2/2020 | Gilson |
| 2020/0145616 A1 | 5/2020 | Nassar |
| 2020/0175961 A1 | 6/2020 | Thomson et al. |
| 2020/0228358 A1 | 7/2020 | Rampton |
| 2020/0243095 A1 | 7/2020 | Adlersberg et al. |
| 2020/0257587 A1 | 8/2020 | Chau et al. |
| 2020/0311122 A1 * | 10/2020 | Ramamurthy ......... G06N 20/20 |
| 2020/0365160 A1 | 11/2020 | Nassar et al. |
| 2020/0403818 A1 | 12/2020 | Daredia et al. |
| 2020/0412564 A1 | 12/2020 | Roedel et al. |
| 2021/0021558 A1 | 1/2021 | Mahmoud et al. |
| 2021/0044645 A1 | 2/2021 | Jayaweera |
| 2021/0058263 A1 | 2/2021 | Fahrendorff et al. |
| 2021/0058517 A1 | 2/2021 | Serbajlo et al. |
| 2021/0092168 A1 * | 3/2021 | Ranalli ................ H04M 3/567 |
| 2021/0150211 A1 | 5/2021 | Ahmad Hambaly et al. |
| 2021/0217420 A1 | 7/2021 | Fu et al. |
| 2021/0319797 A1 | 10/2021 | Fu et al. |
| 2021/0327454 A1 | 10/2021 | Fu et al. |
| 2021/0367802 A1 * | 11/2021 | Yarlagadda ............ G06N 20/00 |
| 2021/0369042 A1 | 12/2021 | Gustman et al. |
| 2021/0374391 A1 | 12/2021 | Jorasch |
| 2021/0390144 A1 | 12/2021 | Ganesh |
| 2021/0407520 A1 | 12/2021 | Neckermann et al. |
| 2021/0409547 A1 | 12/2021 | Channapragada et al. |
| 2022/0122436 A1 | 4/2022 | Volkerink et al. |
| 2022/0343918 A1 | 10/2022 | Fu et al. |
| 2022/0353102 A1 | 11/2022 | Lau et al. |
| 2022/0385758 A1 | 12/2022 | Tadesse et al. |
| 2022/0398544 A1 * | 12/2022 | Chung ................... G06Q 50/16 |
| 2022/0414130 A1 | 12/2022 | Master Ben-Dor |
| 2023/0245660 A1 | 8/2023 | Fu et al. |
| 2023/0267948 A1 | 8/2023 | Younes et al. |
| 2023/0297765 A1 * | 9/2023 | Vendrow ............ G10L 15/1815 |
| | | 704/251 |
| 2023/0325611 A1 | 10/2023 | Garg et al. |
| 2024/0037145 A1 | 2/2024 | Ziccardi et al. |
| 2024/0087574 A1 | 3/2024 | Fu et al. |
| 2024/0095440 A1 | 3/2024 | Rony et al. |
| 2024/0127804 A1 * | 4/2024 | Shirodkar ............ G06F 40/284 |
| 2024/0170006 A1 | 5/2024 | Fu et al. |
| 2024/0205037 A1 * | 6/2024 | Callegari ............ H04L 12/1831 |
| 2024/0338860 A1 * | 10/2024 | Trzyna ................... G06F 40/44 |
| 2024/0340193 A1 * | 10/2024 | Zhu ........................ G06F 40/30 |
| 2024/0354493 A1 | 10/2024 | Nakajima et al. |

(56) References Cited

U.S. PATENT DOCUMENTS

2024/0428800 A1 12/2024 Lau et al.
2025/0117128 A1* 4/2025 Omoigui .............. G06F 3/0482

FOREIGN PATENT DOCUMENTS

JP 2018190431 11/2018
JP 6542983 7/2019

OTHER PUBLICATIONS

Tur et al., "The CALO Meeting Assistant System," *IEEE Transactions on Audio, Speech, and Language Processing*, vol. 18, No. 6, pp. 1601-1611, Aug. 2010.
United States Patent and Trademark Office, Office Action mailed Dec. 7, 2022, in U.S. Appl. No. 17/863,837.
United States Patent and Trademark Office, Office Action mailed Jul. 5, 2023, in U.S. Appl. No. 17/863,837.
United States Patent and Trademark Office, Office Action mailed Oct. 17, 2023, in U.S. Appl. No. 17/863,837.
United States Patent and Trademark Office, Office Action mailed Jun. 5, 2024, in U.S. Appl. No. 17/863,837.
United States Patent and Trademark Office, Office Action mailed Sep. 9, 2024, in U.S. Appl. No. 17/863,837.
United States Patent and Trademark Office, Office Action mailed Jun. 8, 2023, in U.S. Appl. No. 18/127,343.
United States Patent and Trademark Office, Office Action mailed Sep. 20, 2023, in U.S. Appl. No. 18/127,343.
United States Patent and Trademark Office, Notice of Allowance mailed Dec. 13, 2023, in U.S. Appl. No. 18/127,343.
United States Patent and Trademark Office, Notice of Allowance mailed Mar. 25, 2024, in U.S. Appl. No. 18/127,343.
United States Patent and Trademark Office, Notice of Allowance mailed Aug. 15, 2024, in U.S. Appl. No. 18/127,343.
United States Patent and Trademark Office, Office Action mailed Nov. 15, 2023, in U.S. Appl. No. 18/131,982.
United States Patent and Trademark Office, Office Action mailed Apr. 4, 2024, in U.S. Appl. No. 18/131,982.
United States Patent and Trademark Office, Office Action mailed Jul. 26, 2024, in U.S. Appl. No. 18/131,982.
United States Patent and Trademark Office, Office Action mailed Mar. 25, 2024, in U.S. Appl. No. 18/140,981.
United States Patent and Trademark Office, Notice of Allowance mailed Aug. 5, 2024, in U.S. Appl. No. 18/140,981.
United States Patent and Trademark Office, Office Action mailed Aug. 15, 2024, in U.S. Appl. No. 18/514,666.
United States Patent and Trademark Office, Office Action mailed Mar. 29, 2024, in U.S. Appl. No. 18/438,145.
United States Patent and Trademark Office, Notice of Allowance mailed Jul. 23, 2024, in U.S. Appl. No. 18/438,145.
United States Patent and Trademark Office, Office Action mailed Aug. 13, 2024, in U.S. Appl. No. 18/744,259.
United States Patent and Trademark Office, Notice of Allowance mailed Mar. 26, 2025, in U.S. Appl. No. 17/863,837.
United States Patent and Trademark Office, Office Action mailed Jan. 22, 2025, in U.S. Appl. No. 18/131,982.
United States Patent and Trademark Office, Notice of Allowance mailed Oct. 10, 2024, in U.S. Appl. No. 18/140,981.
United States Patent and Trademark Office, Office Action mailed Jan. 24, 2025, in U.S. Appl. No. 18/514,666.
United States Patent and Trademark Office, Office Action mailed Oct. 11, 2024, in U.S. Appl. No. 18/438,145.
United States Patent and Trademark Office, Office Action mailed Feb. 6, 2025, in U.S. Appl. No. 18/438,145.
United States Patent and Trademark Office, Office Action mailed Feb. 7, 2025, in U.S. Appl. No. 18/744,259.
United States Patent and Trademark Office, Office Action mailed Jan. 29, 2025, in U.S. Appl. No. 18/737,530.
United States Patent and Trademark Office, Notice of Allowance mailed May 8, 2025, in U.S. Appl. No. 17/863,837.
United States Patent and Trademark Office, Notice of Allowance mailed Jun. 23, 2025, in U.S. Appl. No. 18/131,982.
United States Patent and Trademark Office, Notice of Allowance mailed Apr. 30, 2025, in U.S. Appl. No. 18/140,981.
United States Patent and Trademark Office, Notice of Allowance mailed Apr. 25, 2025, in U.S. Appl. No. 18/514,666.
United States Patent and Trademark Office, Notice of Allowance mailed Jul. 8, 2025, in U.S. Appl. No. 18/737,530.
United States Patent and Trademark Office, Notice of Allowance mailed Aug. 21, 2025, in U.S. Appl. No. 18/438,145.
United States Patent and Trademark Office, Notice of Allowance mailed Aug. 13, 2025, in U.S. Appl. No. 18/744,259.

* cited by examiner

Open Enrollment staging:/u/qiD-NCpWmH9WucFT9JA_Pns9v-o?f=%2Fmy-notes&tab=summary Open Enrollment So when we talk about the different medical options that you all have, I'm not going to go into the granular details of each plan. we're not talking about the coinsurance the co pays, prescription co pays deductible on every single plan but what I do want to do is talk about benefit plan types at a high level. So the first plan type that I want to talk about is an HMO with it stands for a health maintenance organization and you guys have a couple of different options.

Summary

> Introduction of the meeting. (0:11)

∧ High level overview of benefits. (4:15)
 • Calendar year vs benefit year.
 • Flexible spending account rollover.

• Summarizing

○ Live

SYSTEMS AND METHODS FOR LIVE SUMMARIZATION

CROSS-REFERENCES TO RELATED APPLICATIONS

This application claims priority to U.S. Provisional Application No. 63/468,658, filed May 24, 2023, which is incorporated by referenced herein for all purposes.

FIELD OF THE DISCLOSURE

Some embodiments of the present disclosure are related to generating summaries for meetings, events, and conversations. More particularly, certain embodiments of the present disclosure provide systems and methods for a virtual participant for generating summaries (e.g., live summary). Merely by way of example, the present disclosure includes embodiments of generating summaries via a virtual participant, but it would be recognized that the present disclosure has much broader range of applicability.

BACKGROUND

Conversations and/or meetings, such as human-to-human conversations, include information that is often difficult to comprehensively, efficiently, and accurately extract, using conventional methods and systems. For example, conventional note-taking performed during a conversation not only distracts the note-taker from the conversation but can also lead to inaccurate recordation of information due to human-error, such as for human's inability to multitask well and process information efficiently with high accuracy in real time. The high volume of information presented in various conversations (e.g., meetings) often can lead to information overload for attendees. Also, sometimes, time constraints and/or overlapping schedules may prevent individuals from joining certain meetings on time and/or attending some meetings at all. Additionally, some individuals may find it challenging to closely follow discussions at certain meetings. Hence it is highly desirable to improve the technique for organizing information presented at various conversations and/or meetings.

BRIEF SUMMARY OF THE DISCLOSURE

Some embodiments of the present disclosure are related to generating summaries for meetings, events, and conversations. More particularly, certain embodiments of the present disclosure provide systems and methods for a virtual participant for generating summaries (e.g., live summary). Merely by way of example, the present disclosure includes embodiments of generating summaries via a virtual participant, but it would be recognized that the present disclosure has much broader range of applicability.

According to certain embodiments, a computer-implemented method for generating a live summary for a meeting, the method comprises: obtaining, via a virtual participant of the meeting, a first set of audio data associated with the meeting while the meeting occurs; transcribing, via the virtual participant, the first set of audio data into a first set of text data while the meeting occurs; generating, via the virtual participant, a first version of a live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data.

According to some embodiments, a computing system for generating a live summary for a meeting, the system comprises: one or more memories including instructions stored thereon; and one or more processors configured to execute the instructions and perform operations comprising: obtaining a first set of audio data associated with the meeting while the meeting occurs; transcribing the first set of audio data into a first set of text data while the meeting occurs; generating a first version of a live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data.

According to certain embodiments, a non-transitory computer-readable medium storing instructions for generating a live summary for a meeting, the instructions upon execution by one or more processors of a computing system, cause the computing system to perform one or more operations comprising: obtaining a first set of audio data associated with the meeting while the meeting occurs; transcribing the first set of audio data into a first set of text data while the meeting occurs; generating a first version of a live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data.

Depending upon the embodiment, one or more benefits may be achieved. These benefits, features, and advantages of the present disclosure can be fully appreciated with reference to the detailed description and accompanying drawings that follow.

BRIEF DESCRIPTION OF THE DRAWINGS

FIG. 4 is a simplified diagram showing a screenshot for displaying one or more summaries that have been generated by the system for live summarization as shown in FIG. 2 using the method for live summarization as shown in FIG. 3 according to certain embodiments of the present disclosure.

FIG. 5 is a simplified diagram showing another screenshot for displaying one or more summaries that have been generated by the system for live summarization as shown in FIG. 2 using the method for live summarization as shown in FIG. 3 according to some embodiments of the present disclosure.

Figure 1:
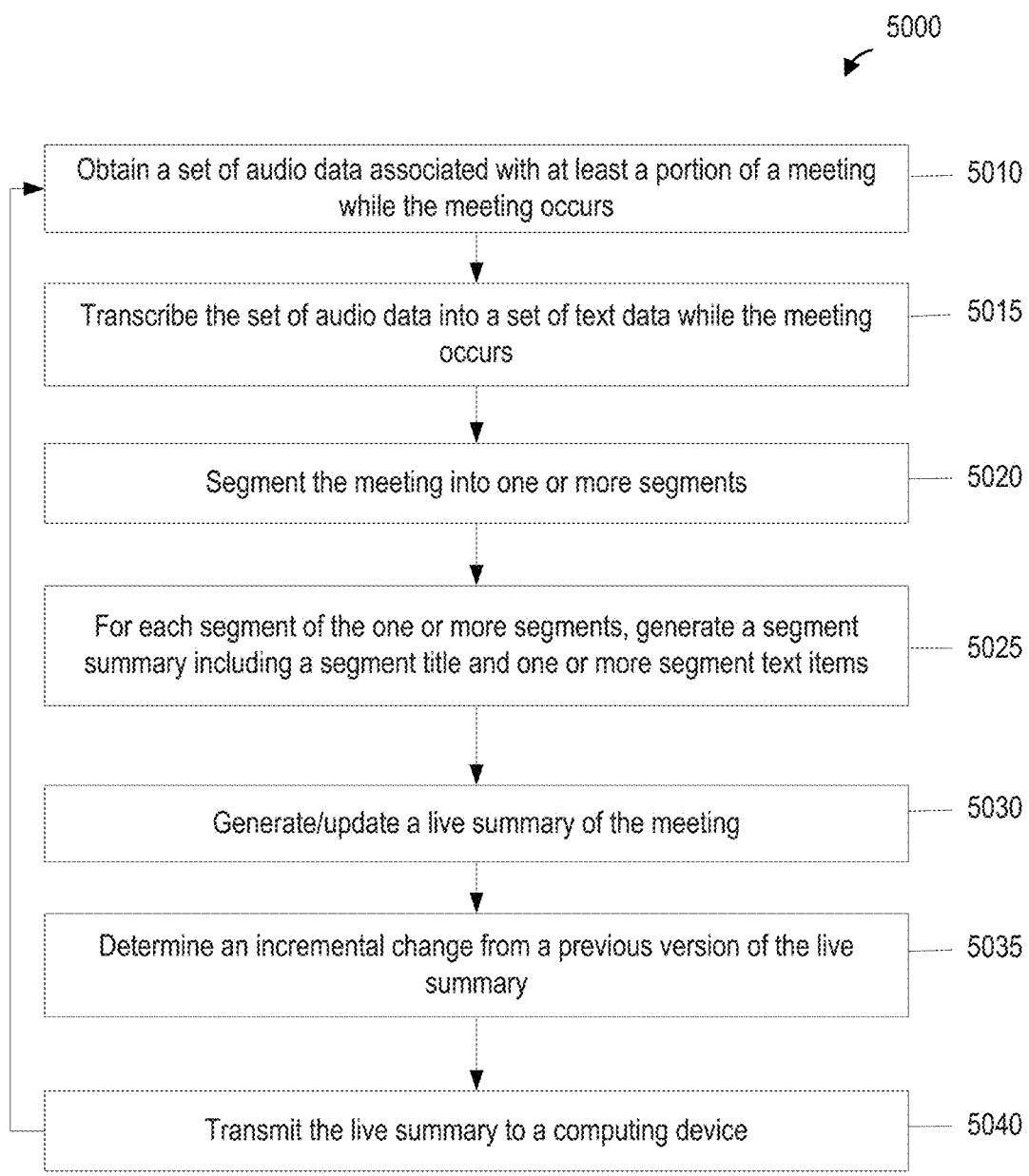
FIG. 1 is a simplified diagram showing a method for generating a live summary of a meeting (e.g., a conversation, an online meeting, an event, etc.), according to certain embodiments of the present disclosure.

While the present disclosure is amenable to various modifications and alternative forms, specific embodiments have been shown by way of example in the drawings and are described in detail below. The present disclosure is intended to cover all modifications, equivalents, and alternatives falling within the scope of the present disclosure as defined by the appended claims.

DETAILED DESCRIPTION OF THE DISCLOSURE

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information. Some embodiments of the present disclosure are related to a virtual meeting participant (e.g., a virtual assistant). More particularly, certain embodiments of the present disclosure provide systems and methods for a virtual meeting participant for media services. Merely by way of example, the present disclosure has been applied to using the screen captures (e.g., automatically captured screen captures) via a virtual meeting participant, but it would be recognized that the present disclosure has much broader range of applicability.

The high volume of information presented in various meetings and/or conversations often can lead to information overload for attendees. Also, sometimes, time constraints and/or overlapping schedules may prevent individuals from joining certain meetings on time and/or attending some meetings at all. Additionally, some individuals may find it challenging to closely follow discussions at certain meetings. Hence it is highly desirable to improve the technique for organizing information presented at various meetings and/or conversations.

According to some embodiments, the present disclosure discloses a system and method for live summarization of online meetings, conversations, and/or events. For example, the system and method for live summarization improves information retention, supports efficient time management, facilitates decision-making, increases accessibility, supports multitasking, and/or encourages collaboration and/or alignment among meeting participants. As an example, the system and method for live summarization enhances focus and/or engagement of certain meeting participants.

FIG. 1 is a simplified diagram showing a method 5000 for generating a live summary of a meeting (e.g., a conversation, an online meeting, an event, etc.), according to certain embodiments of the present disclosure. This diagram is merely an example. One of ordinary skill in the art would recognize many variations, alternatives, and modifications. The method 5000 for generating conversation summaries includes processes 5010, 5015, 5020, 5025, 5030, 5035, and 5040. Although the above has been shown using a selected group of processes for the method 5000 for generating live summaries, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

Figure 2:
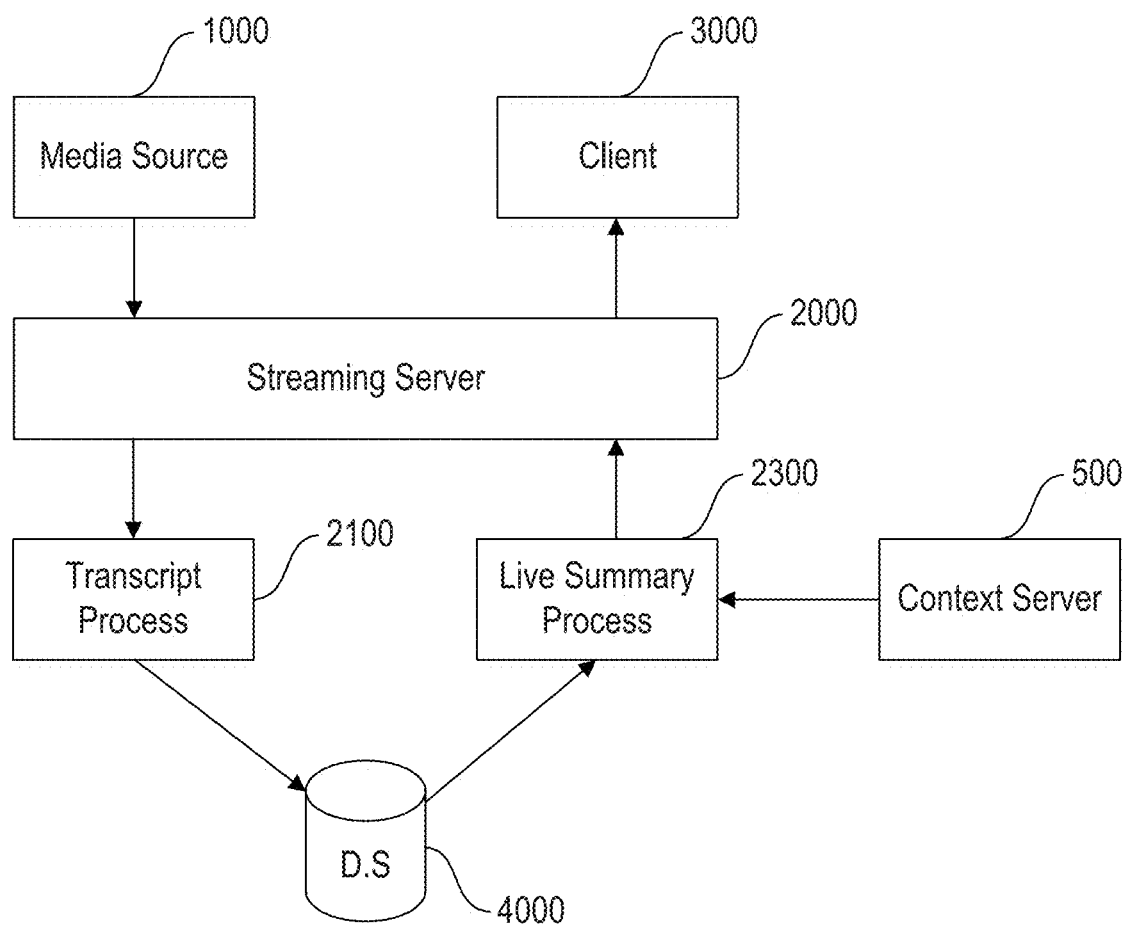
FIG. 2 is a simplified diagram showing a system for live summarization of one or more meetings (e.g., conversations) and/or one or more events according to certain embodiments of the present disclosure.

In some embodiments, some or all processes (e.g., steps) of the method 5000 are performed by a system (e.g., the computing system illustrated in FIG. 2). In certain examples, some or all processes (e.g., steps) of the method 5000 are performed by a computer and/or a processor directed by a code. For example, a computer includes a server computer and/or a client computer (e.g., a personal computer). In some examples, some or all processes (e.g., steps) of the method 5000 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, the method 5000 includes a process 5010 of receiving and/or obtaining a first set of audio data associated with the meeting while the meeting occur. In certain embodiments, the system obtains, via a virtual participant of the meeting, a first set of audio data associated with the meeting while the meeting occur. In some embodiments, a virtual meeting participant (e.g., a virtual assistant). In some embodiments, a virtual assistant can join a meeting (e.g., with a visual representation of the virtual assistant, as a named participant to the meeting, etc.), record a meeting, transcribe a meeting, and/or provide other functionalities.

According to certain embodiments, the method 5000 includes a process 5015 of transcribing the first set of audio data into a first set of text data while the meeting occurs. In some embodiments, the process 5015 of transcribing the first set of audio data into a first set of text data while the meeting occur is via the virtual participant. In certain embodiments, the system transcribes the first set of audio data into a first set of text data while the meeting occur via a machine-learning model for transcription.

According to some embodiments, the method 5000 includes a process 5020 of segmenting the meeting into one or more segments. In certain embodiments, the system segments the meeting into the one or more segments based on at least one selected from a group consisting of a segment duration, a topic change, context information, and a speaker change. In some embodiments, the system segments the meeting to add a segment regularly (e.g., every two (2) minutes, every five (5) minutes, etc.). In certain embodiments, the system segments the meeting to add a segment upon a trigger including, for example, context information, a speaker change, a topic change, and/or the like.

According to certain embodiments, the method 5000 includes a process 5025 of for each segment of the one or more segments, generating a segment summary including a segment title and one or more segment text items. In some embodiments, the one or more text items of the live summary include the one or more segment text items. the system is configured to generate a first segment summary in a first level of granularity and generate a second segment summary in a second level of granularity. In certain embodiments, the first level of granularity higher than the second level of granularity. In some embodiments, the first segment summary is shorter than the second segment summary. In certain embodiments, the second segment summary includes one or more text items not in the first segment summary.

According to some embodiments, the method 5000 includes a process 5030 of generating and/or updating a live summary of the meeting. In certain embodiments, the system generating, a first version of the live summary of the meeting based at least in part on the first set of text data, the live summary including one or more text items. In some embodiments, the system generating, via the virtual participant, the first version of the live summary of the meeting based at least in part on the first set of text data, the live summary including one or more text items. In certain embodiments, the system updates the live summary of the meeting to a second version of the live summary based at least in part on a second set of audio data, wherein the second set of audio data is subsequent to the first set of audio data. In some embodiments, the live summary includes a plurality of topics and a plurality of sections, where each topic of the plurality of topics is associated with one of the plurality of sections.

According to certain embodiments, the plurality of topics and the plurality of sections are organized in the live summary in an order of priority. In some embodiments, a section includes a segment summary and a topic includes a segment title. In certain embodiments, the system generates the first version of the live summary using a first machine-learning model. In some embodiments, the system edits the first version of the live summary using a second machine-learning model, where the first machine-learning model is different from the second machine-learning model.

According to some embodiments, the system summarizes media data used in the meeting into a summarized media data, where the summarized media data is shorter than the media data. In certain embodiments, the system incorporates the summarized media data in the live summary. In some embodiments, the system processes the media data to extract text content. In certain embodiments, the system incorporates the extracted text content into the live summary.

According to certain embodiments, the one or more text items include at least one selected from a group consisting of one or more action items, one or more description items, one or more question-and-answer sections, and one or more decision items. In some embodiments, the one or more segment text items include at least one selected from a group consisting of one or more action items, one or more description items, one or more question-and-answer sections, and one or more decision items.

According to some embodiments, the system updates the live summary of the meeting when a subsequent segment of the meeting is determined. In certain embodiments, the system generates one or more second text items based at least in part on the second set of audio data. In some embodiments, the system adds the one or more second text items to the second version of the live summary. In certain embodiments, the system adds the one or more second text items to the second version of the live summary chronically (e.g., at the end of the live summary). In some embodiments, the system inserts at least one of the one or more second text items in a section under a topic in the second version of the live summary. In certain embodiments, the system determines a change to an importance of one of the plurality of topics in the second set of audio data. In some embodiments, the system reorganizes the plurality of topics and the plurality of sections. In certain embodiments, the system organizes the live summary chronologically. For example, the live summary includes a first section corresponding to the first set of audio data and a second section corresponding to the second set of audio data, where the second section is after the first section, and the second set of audio data is subsequent to the first set of audio data.

According to certain embodiments, the system selects the topic using a machine-learning model based on at least one of the one or more text items. For example, the system determines a heatmap to represent priority of topics. In some embodiments, the system organizes the live summary based on the priority of topics. In certain embodiments, the system determines a segment topic based at least in part on the segment data, including audio data and/or text data. In some embodiments, the system inserts the segment summary and/or the one or more segment text items based at least in part on the segment topic.

According to some embodiments, the method 5000 includes a process 5035 of determining an incremental change from a previous version of the live summary. In certain embodiments, the system determines an incremental change between the first version of the live summary and the second version of the live summary.

According to certain embodiments, the method 5000 includes a process 5040 of transmitting the live summary to a computing device. In some embodiments, the system transmits the live summary to one or more computing devices. In certain embodiments, the system transmits the live summary to one or more computing devices corresponding to one or more participants of the meeting, for example, via push operations. In some embodiments, the system transmits the incremental change to one or more computing devices.

In certain embodiments, the system transmits updated version of the live summary, for example, the incremental change, to one or more computing devices periodically (e.g., every three (3) minutes, every five (5) minutes, etc.). In some embodiments, the system transmits the first version of the live summary to a computing device while the meeting occurs at a first time and the second version of the live summary to the computing device while the meeting occurs at a second time, where the second time is subsequent to the first time. In certain embodiments, the second time is associated with when a segment is determined.

According to some embodiments, at least one of the one or more text items include a time indication. In the example illustrated in FIG. 4 and FIG. 5, at least one of the one or more text items include a time indication. In certain embodiments, the system goes back to the process 5010 to process a subsequent set of audio data and/or subsequent set of text data.

FIG. 2 is a simplified diagram showing a system for live summarization of one or more meetings (e.g., conversations) and/or one or more events according to certain embodiments of the present disclosure. This diagram is merely an example, which should not unduly limit the scope of the claims. One of ordinary skill in the art would recognize many variations, alternatives, and modifications. The system for live summarization includes a media source 1000, a streaming server 2000, a transcript processing unit 2100, a live summary processing unit 2300, a context server 500, and a data storage 4000. Although the above has been shown using a selected group of components for the system for live summarization, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present disclosure.

In some examples, the streaming server 2000 handles one or more requests from the media source 1000 and also outputs summary data (e.g., a live summary snippet) to a client device 3000. For example, the streaming server 2000 receives the one or more requests from the media source 1000 and also processes the received one or more requests. In certain examples, the live summary processing unit 2300 receives transcript data from the data storage 4000 and also metadata from the context server 500 to create summary data to be returned to the client device 3000. For example, the live summary processing unit 2300 generates the summary data based at least in part on the received transcript data and/or the received metadata, and also sends the summary data to the streaming server 2000. In some examples, the transcript processing unit 2100 generates the transcript data and outputs the generated transcript data to the data storage 4000. For example, the data storage 4000 sends the transcript data to the live summary processing unit 2300.

According to some embodiments, the system for live summarization of one or more meetings, also referred to as conversations, and/or one or more events is a system for real-time summarization (e.g., within one (1) second, within three (3) seconds, within five (5) seconds, etc.) of one or more online meetings and/or events using one or more artificial intelligence algorithms. In certain examples, the live summary processing unit 2300 includes a data processing module, for example, a virtual assistant. For example, the data processing module receives and analyzes content from the one or more online meetings and/or one or more events by using one or more natural language processing algorithms to extract and/or analyze textual content from the one or more online meetings and/or one or more events. As an example, the data processing module receives and analyzes content from the one or more online meetings and/or one or more events by also using one or more computer vision algorithms to analyze one or more visual elements of one or more media presentations and to select relevant content.

In some embodiments, a virtual assistant can join a meeting (e.g., with a visual representation of the virtual assistant, as a named participant to the meeting, etc.), record a meeting, transcribe a meeting, generate a meeting summary, and/or provide other functionalities.

In some examples, the system for real-time summarization of one or more online meetings and/or events using one or more artificial intelligence algorithms is further configured to perform one or more of the following tasks or all of the following tasks:

a) Segment the content of a conversation and/or a speech into one or more segments according to certain embodiments. For example, the one or more segments are generated based at least in part on the duration of the meeting, the content of the meeting, and/or the speaker. As an example, certain types of segments, such as topical segments, are non-chronological and contain content from different parts of the conversation and/or the speech.

b) Generate at least one summary for each segment of the one or more segments according to some embodiments. In certain examples, each summary includes a segment title, one or more bullet point lists, paragraph text, one or more lists of one or more action items and/or one or more decisions, one or more topical summaries, and/or one or more question-and-answer sections. For example, each summary includes some, not all, of a segment title, one or more bullet point lists, paragraph text, one or more lists of one or more action items, one or more lists of one or more decisions, one or more topical summaries, and one or more question-and-answer sections. As an example, each summary includes all of a segment title, one or more bullet point lists, paragraph text, one or more lists of one or more action items, one or more lists of one or more decisions, one or more topical summaries, and one or more question-and-answer sections.

c) Generate one or more summaries at one or more levels of granularity according to certain embodiments. For example, one summary is generated for a specific segment, and another summary is generated for multiple segments that include the specific segment. As an example, at least two summaries are generated for a specific segment, one summary being more concise than the other summary for the same specific segment.

d) Generate the one or more summaries that are sent to the client device 3000 incrementally according to some embodiments. For example, one or more new and/or updated summaries are sent to the client device 3000 after one or more chunks of the transcript for the conversation and/or the speech have been generated. As an example, one or more new and/or updated summaries are sent to the client device 3000 a time duration (e.g., one or more minutes) after one or more previous summaries have been sent to the client device 3000.

e) Generate the one or more summaries that are sent to the client device 3000 by streaming according to certain embodiments. For example, one or more new and/or updated summaries are sent to the client device 3000 continuously as new data for the conversation and/or the speech (e.g., less than one chunk of the transcript) has been generated. As an example, one or more new and/or updated summaries are sent to the client device 3000 continuously in real time as the conversation and/or the speech occurs.

f) Customize one or more summaries based on the specific type of meeting (e.g., an interview, a sales call, a team meeting, and/or an all-hands meeting) according to some embodiments.

Summarize presented media, one or more slides, screen-sharing, and/or video into one or g) more short video clips and/or selected relevant media based on content according to certain embodiments.

h) Tailor one or more summaries according to one or more user preferences, one or more roles, and/or one or more historical interactions in order to generate one or more summaries tailored specifically to the user of the client device 3000 according to some embodiments.

i) Regenerate one or more new summaries by altering one or more corresponding existing summaries based on desired length, style, and/or content focus according to certain embodiments.

j) Create one or more summaries based at least in part on selected live content according to some embodiments. For example, certain content of the conversation and/or the speech is selected according to one or more time periods, one or more specific participants, and/or one or more discussion topics. As an example, the selected content includes content from different parts of the conversation and/or the speech.

k) Organize one or more summaries in the order of their importance according to certain embodiments. For example, different summaries cover different topics, and the summary that covers the most important topic is placed at the top of the list of the one or more summaries. As an example, the organization of one or more summaries is dynamically updated if the importance of the one or more summaries changes in response to more data of the conversation and/or the speech having been processed.

l) Edit one or more summaries for enhanced comprehension and/or recall by the user of the client device 3000 according to some embodiments.

m) Make one or more summaries visible to all participants of the conversation and/or the speech according to certain embodiments. For example, each participant uses a different client device 3000. As an example, multiple participants share the same client device 3000.

n) Send one or more summaries to one or more client devices through one or more communication methods according to some embodiments. For example, the one or more communication methods include web interface, mobile application, conference system, and/or instant messaging application. As an example, the one or more communication methods include using a push notification.

In some embodiments, the data repository 4000 can include audio data, visual data, transcripts, summaries, screen captures (e.g., snapshots, images, captured images, captured videos, etc.), extracted content, messages, events, annotations, account information, and/or the like. The repository 4000 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the system for live summarization can execute software or firmware stored in non-transitory computer-readable medium to implement various processing steps. Various components and processors of the system for live summarization can be implemented by one or more computing devices including, but not limited to, circuits, a computer, a cloud-based processing unit, a processor, a processing unit, a microprocessor, a mobile computing device, and/or a tablet computer. In some cases, various components of the system for live summarization can be implemented on a shared computing device. Alternatively, a component of the system for live summarization can be implemented on multiple computing devices. In some implementations, various modules and components of the system for live summarization can be implemented as software, hardware, firmware, or a combination thereof. In some cases, various components of the system for live summarization can be implemented in software or firmware executed by a computing device.

Various components of the system for live summarization can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 3:
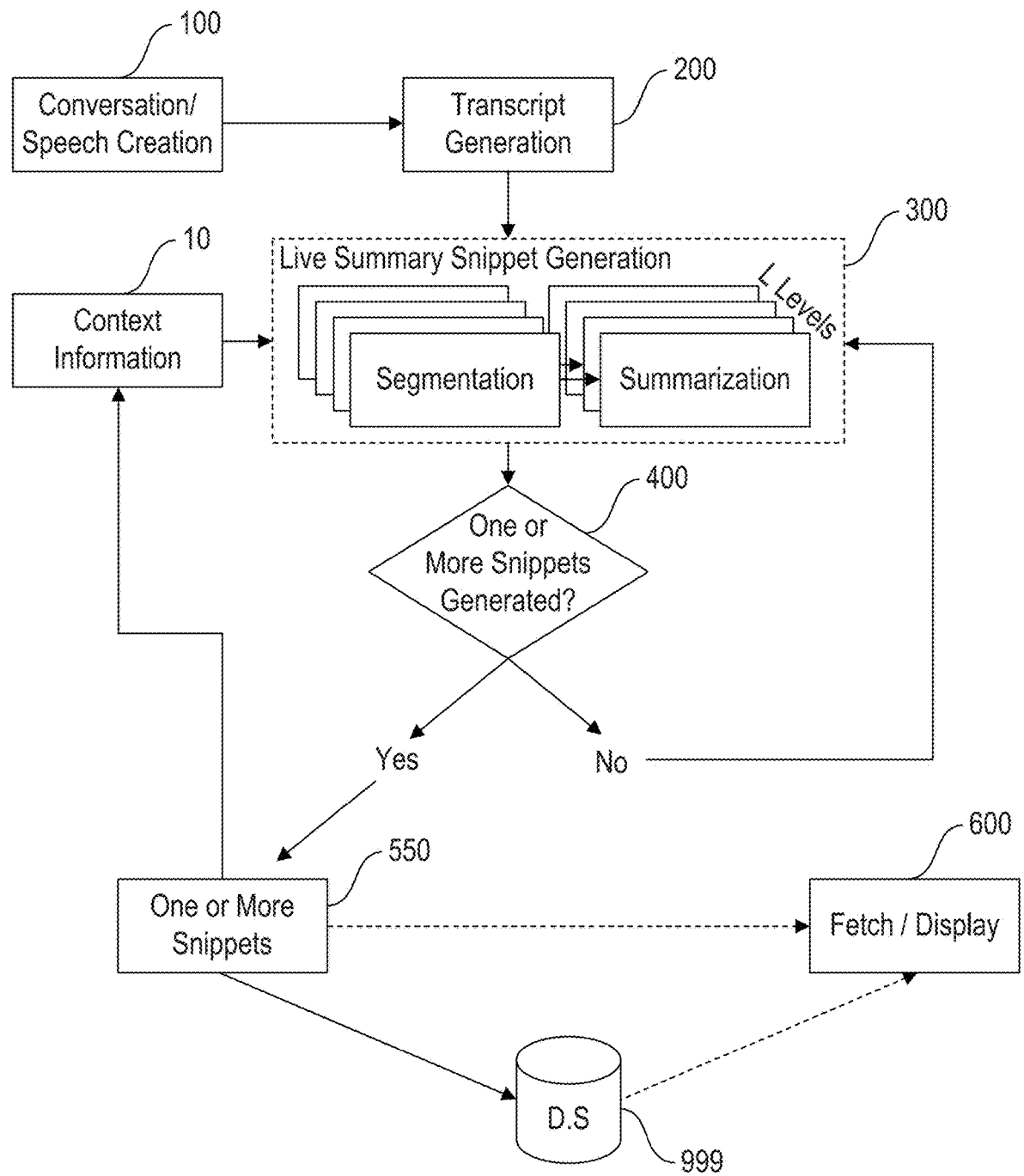
FIG. 3 is a simplified diagram showing a method for live summarization of one or more meetings and/or one or more events according to some embodiments of the present disclosure.

FIG. 3 is a simplified diagram showing a method for live summarization of one or more meetings and/or one or more events according to some embodiments of the present disclosure. This diagram is merely an example, which should not unduly limit the scope of the claims. One of ordinary skill in the art would recognize many variations, alternatives, and modifications. For example, the method for live summarization includes a process 100 for creating one or more parts of a conversation and/or a speech, a process 200 for generating one or more parts of a transcript, a process 300 for using live summary generation service, a process 400 for determining whether or not one or more new live summary snippets have been generated, a process 999 for storing the one or more new live summary snippets in a data storage, and a process 600 for sending the one or more new live summary snippets to a streaming server and outputting the one or more new live summary snippets to one or more client devices for display. As an example, the method for live summarization also includes a process 10 for generating metadata, for example, generating and/or extracting context information. Although the above has been shown using a selected group of processes for the method for live summarization, there can be many alternatives, modifications, and variations. For example, some of the processes may be expanded and/or combined. Other processes may be inserted to those noted above. Depending upon the embodiment, the sequence of processes may be interchanged with others replaced. Further details of these processes are found throughout the present disclosure.

At the process 100, one or more parts of a conversation and/or a speech are created according to certain embodiments. In some examples, the one or more parts of the conversation and/or the speech are created by at least the media source 1000. For example, the one or more parts of the conversation and/or the speech are not the entire conversation and/or the entire speech respectively. As an example, the one or more parts of the conversation and/or the speech are the entire conversation and/or the entire speech respectively.

In certain examples, each part of the one or more parts of the conversation and/or the speech includes a paragraph, a sentence, and/or a word. For example, each part of the one or more parts of the conversation and/or the speech includes a paragraph. As an example, each part of the one or more parts of the conversation and/or the speech includes a sentence. For example, each part of the one or more parts of the conversation and/or the speech includes a word.

At the process 200, one or more parts of a transcript are generated based at least in part on the one or more parts of the conversation and/or the speech according to some embodiments. In some examples, the one or more parts of the transcript is generated by at least the transcript processing unit 2100. For example, the one or more parts of the transcript are not the entire transcript for the entire conversation and/or the entire speech respectively. As an example, the one or more parts of the transcript are the entire transcript for the entire conversation and/or the entire speech respectively. In certain examples, each part of the one or more parts of the transcript includes a paragraph, a sentence, and/or a word. For example, each part of the one or more parts of the transcript includes a paragraph. As an example, each part of the one or more parts of the transcript includes a sentence. For example, each part of the one or more parts of the transcript includes a word.

At the process 300, the live summary generation service is used according to certain embodiment. For example, the live summary generation service is used in order to create one or more new live summary snippets based at least in part on the one or more parts of the transcript.

In some examples, the live summary generation service is provided by the live summary processing unit 2300 (e.g., by the data processing module of the live summary processing unit 2300). For example, the live summary processing unit 2300 receives the one or more parts of the transcript generated by the transcript processing unit 2100 and also receives metadata from the context server 500. As an example, the live summary generation service is used to create one or more new live summary snippets based at least in part on the one or more parts of the transcript and the metadata. In certain examples, the live summary generation service takes one or more chunks of the transcript and also the context metadata of the conversation and/or the speech. For example, the live summary generation service attempts to use the one or more chunks of the transcript and also the context metadata to create one or more new live summary snippets as part of real-time summarization of one or more online meetings and/or events.

At the process 400, whether or not one or more new live summary snippets have been generated is determined according to some embodiments. In certain examples, if it is determined that one or more new live summary snippets have been generated, the process 999 and/or the process 600 is performed. For example, if it is determined that one or more new live summary snippets have been generated, the process 999 is performed. As an example, if it is determined that one or more new live summary snippets have been generated, the process 600 is performed. In some examples, if it is determined that one or more new live summary snippets have not been generated, the process 300 is performed again. For example, if it is determined that one or more new live summary snippets have not been generated, one or more parameters for the live summary generation service are adjusted and then the process 300 is performed again.

At the process 999, the one or more new live summary snippets are stored in a data storage according to certain embodiments. For example, the one or more new live summary snippets are the one or more new live summary snippets 550. As an example, the data storage is the data storage 4000.

At the process 600, the one or more new live summary snippets are sent to a streaming server, which then outputs the one or more new live summary snippets to one or more client devices for display according to some embodiments. For example, the streaming server is the streaming server 2000. As an example, the one or more client devices includes the client device 3000. In certain examples, the one or more new live summary snippets are fetched by the streaming server (e.g., the streaming server 2000), which outputs the one or more new live summary snippets to the one or more client devices (e.g., the client device 3000). For example, the one or more new live summary snippets are sent from the data storage 4000 to the streaming server 2000. As an example, the one or more new live summary snippets are sent from the live summary processing unit 2300 to the streaming server 2000. In some examples, the one or more new live summary snippets are displayed on the one or more client devices (e.g., the client device 3000).

At the process 10, metadata (e.g., context information) are generated by a context server (e.g., the context server 500) according to certain embodiments. For example, the context server (e.g., the context server 500) receives the one or more new live summary snippets. As an example, the context server (e.g., the context server 500) generates additional metadata based at least in part on the one or more new live summary snippets. In some examples, the context server (e.g., the context server 500) sends the additional metadata to the live summary processing unit 2300. For example, the live summary processing unit 2300 uses at least the additional metadata to generate one or more additional live summary snippets.

As discussed above and further emphasized here, the method for live summarization of one or more meetings and/or one or more events as shown in FIG. 3 is performed by the system for live summarization of one or more meetings and/or one or more events as shown in FIG. 2 according to some embodiments. In certain examples, some or all processes of the method for live summarization as shown in FIG. 3 are performed continuously in order to generate one or more new live summary snippets when one or more additional parts of a conversation and/or a speech are created. For example, the one or more new live summary snippets are one or more additional summary snippets that cover one or more additional parts of the conversation and/or the speech that are not covered by one or more existing live summary snippets. As an example, the one or more new live summary snippets are one or more replacement summary snippets that are generated by altering one or more existing live summary snippets based at least in part on one or more additional parts of the conversation and/or the speech. In some examples, the one or more new live summary snippets are sent to one or more client devices (e.g., the client device 3000) incrementally and/or by streaming. For example, the one or more new live summary snippets are sent to one or more client devices (e.g., the client device 3000) incrementally, a time duration (e.g., one or more minutes) after one or more existing summaries have been sent to the one or more client devices (e.g., the client device 3000). As an example, the one or more new live summary snippets are sent to one or more client devices (e.g., the client device 3000) by streaming, continuously in real time as the conversation and/or the speech occurs.

FIG. 4 is a simplified diagram showing a screenshot for displaying one or more summaries that have been generated by the system for live summarization as shown in FIG. 2 using the method for live summarization as shown in FIG. 3 according to certain embodiments of the present disclosure. This diagram is merely an example, which should not unduly limit the scope of the claims. One of ordinary skill in the art would recognize many variations, alternatives, and modifications. In some embodiments, the client device 3000 provides one or more updates of a transcript by displaying one or more new parts of the transcript and also provides one or more updates of a summary for the transcript by displaying one or more new live summary snippets. In certain embodiments, the one or more new live summary snippets are sent to the client device 3000 incrementally and/or by streaming. For example, the one or more new live summary snippets are displayed on the client device 3000 incrementally, a time duration (e.g., one or more minutes) after one or more new parts of the transcript have appeared on the display of the client device 3000. As an example, the one or more new live summary snippets are displayed on the client device 3000 by streaming, continuously in real time as one or more new parts of the transcript appear on the display of the client device 3000.

Figure 5:
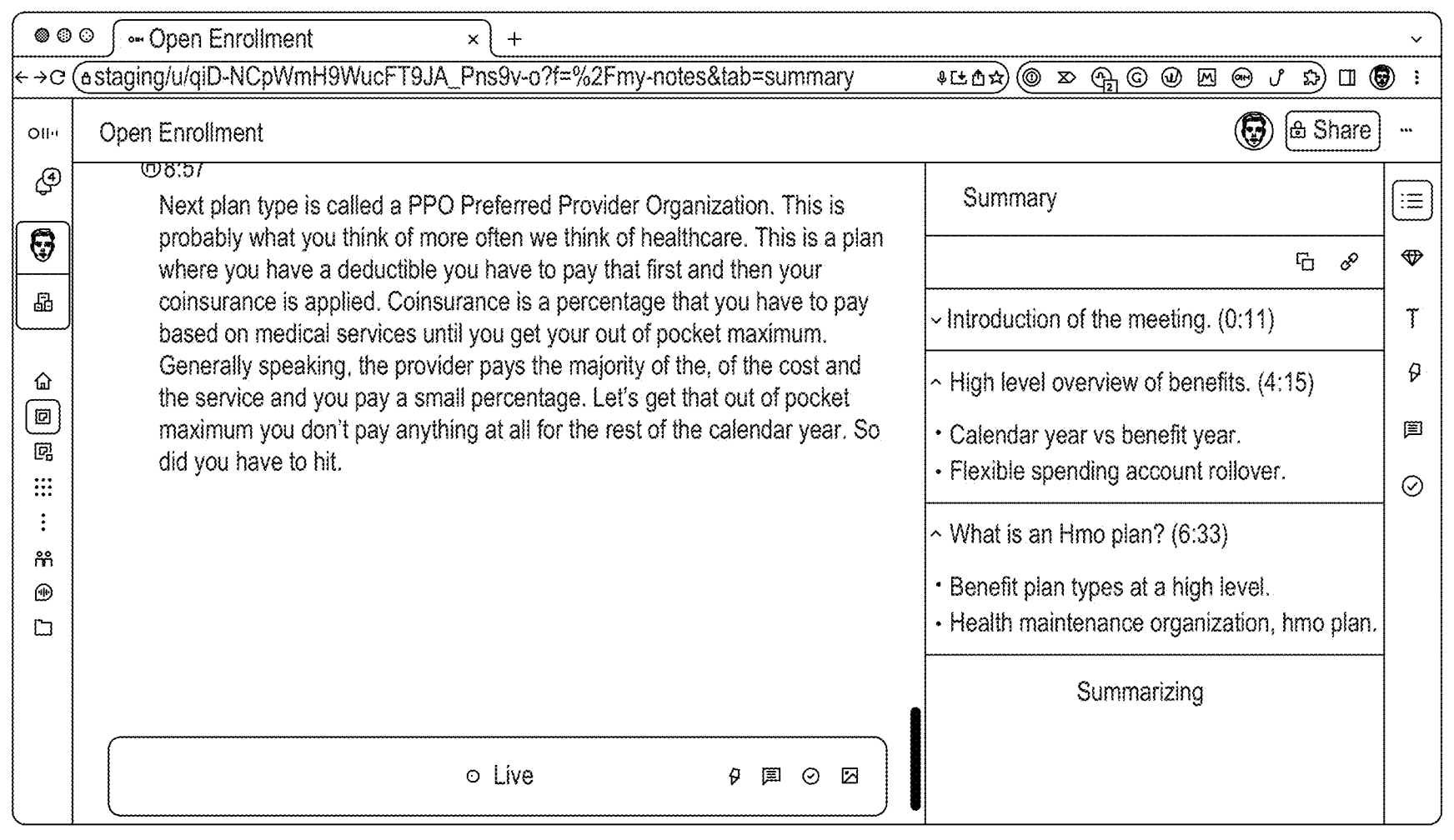

FIG. 5 is a simplified diagram showing another screenshot for displaying one or more summaries that have been generated by the system for live summarization as shown in FIG. 2 using the method for live summarization as shown in FIG. 3 according to some embodiments of the present disclosure. This diagram is merely an example, which should not unduly limit the scope of the claims. One of ordinary skill in the art would recognize many variations, alternatives, and modifications. In certain embodiments, the client device 3000 provides one or more updates of a transcript by displaying one or more new parts of the transcript and also provides one or more updates of a summary for the transcript by displaying one or more new live summary snippets. In some embodiments, the one or more new live summary snippets are sent to the client device 3000 incrementally and/or by streaming. For example, the one or more new live summary snippets are displayed on the client device 3000 incrementally, a time duration (e.g., one or more minutes) after one or more new parts of the transcript have appeared on the display of the client device 3000. As an example, the one or more new live summary snippets are displayed on the client device 3000 by streaming, continuously in real time as one or more new parts of the transcript appear on the display of the client device 3000.

According to certain embodiments, computer-implemented method for generating a live summary for a meeting, the method comprising: obtaining, via a virtual participant of the meeting, a first set of audio data associated with the meeting while the meeting occurs; transcribing, via the virtual participant, the first set of audio data into a first set of text data while the meeting occurs; generating, via the virtual participant, a first version of a live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data. For example, the method is implemented according to at least FIG. 1, FIG. 2, FIG. 3, FIG. 4, and/or FIG. 5.

In some embodiments, the one or more text items include at least one selected from a group consisting of one or more action items, one or more description items, one or more question-and-answer sections, and one or more decision items. In certain embodiments, the operations further comprise: segmenting the meeting into one or more segments; for each segment of the one or more segments, generating a segment summary including a segment title and one or more segment text items, the segment summary being a part of the live summary. In some embodiments, the segmenting the meeting into one or more segments includes segmenting the meeting into the one or more segments based on at least one selected from a group consisting of a segment duration, a topic change, context information, and a speaker change. In certain embodiments, the generating a segment summary includes generating a first segment summary in a first level of granularity and generating a second segment summary in a second level of granularity, wherein the first level of granularity higher than the second level of granularity, wherein the first segment summary is shorter than the second segment summary.

In some embodiments, the updating the live summary of the meeting includes updating the live summary of the meeting when a subsequent segment of the meeting is determined. In certain embodiments, the updating the live summary of the meeting includes: generating one or more second text items based at least in part on the second set of audio data; adding the one or more second text items to the second version of the live summary. In some embodiments, the adding the one or more second text items to the live summary includes inserting at least one of the one or more second text items in a section under a topic in the second version of the live summary. In certain embodiments, the operations further comprise: selecting the topic using a machine-learning model based on the at least one of the one or more second text items. In some embodiments, the section includes a segment summary and the topic includes a segment title. In certain embodiments, the live summary includes a plurality of topics and a plurality of sections, wherein each topic of the plurality of topics is associated with one of the plurality of sections.

In some embodiments, the plurality of topics and the plurality of sections are organized in the live summary in an order of priority. In certain embodiments, the updating the live summary of the meeting includes: determining a change to an importance of one of the plurality of topics; and reorganizing the plurality of topics and the plurality of sections. In some embodiments, the operations further comprise: transmitting the first version of the live summary to a computing device while the meeting occurs at a first time; and transmitting the second version of the live summary to the computing device while the meeting occurs at a second time, the second time being subsequent to the first time. In certain embodiments, the transmitting the second version of the live summary to the computing device includes: determining an incremental change between the first version of the live summary and the second version of the live summary; and transmitting the incremental change to the computing device. In certain embodiments, the second time is associated with when a segment is determined.

In some embodiments, the method further comprises: transmitting a third version of the live summary to the computing device while the meeting occurs at a third time, the third time being subsequent to the second time; wherein a first time difference between the first time and the second time is equal to a second time difference between the second time and the third time. In certain embodiments, at least one of the one or more text items include a time indication. In some embodiments, the generating a first version of a live summary includes generating the first version of the live summary using a first machine-learning model, wherein the operations further comprise editing the first version of the live summary using a second machine-learning model, wherein the first machine-learning model is different from the second machine-learning model. In certain embodiments, the method further comprises: summarizing media data used in the meeting into a summarized media data, the summarized media data being shorter than the media data.

According to some embodiments, a computing system for generating a live summary for a meeting, the system comprising: one or more memories including instructions stored thereon; and one or more processors configured to execute the instructions and perform operations comprising: obtaining a first set of audio data associated with the meeting while the meeting occurs; transcribing the first set of audio data into a first set of text data while the meeting occurs; generating a first version of a live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data. For example, the system is implemented according to at least FIG. 1, FIG. 2, FIG. 3, FIG. 4, and/or FIG. 5.

In some embodiments, the one or more text items include at least one selected from a group consisting of one or more action items, one or more description items, one or more question-and-answer sections, and one or more decision items. In certain embodiments, the operations further comprise: segmenting the meeting into one or more segments; for each segment of the one or more segments, generating a segment summary including a segment title and one or more segment text items, the segment summary being a part of the live summary. In some embodiments, the segmenting the meeting into one or more segments includes segmenting the meeting into the one or more segments based on at least one selected from a group consisting of a segment duration, a topic change, context information, and a speaker change. In certain embodiments, the generating a segment summary includes generating a first segment summary in a first level of granularity and generating a second segment summary in a second level of granularity, wherein the first level of granularity higher than the second level of granularity, wherein the first segment summary is shorter than the second segment summary.

In some embodiments, the updating the live summary of the meeting includes updating the live summary of the meeting when a subsequent segment of the meeting is determined. In certain embodiments, the updating the live summary of the meeting includes: generating one or more second text items based at least in part on the second set of audio data; adding the one or more second text items to the second version of the live summary. In some embodiments, the adding the one or more second text items to the live summary includes inserting at least one of the one or more second text items in a section under a topic in the second version of the live summary. In certain embodiments, the operations further comprise: selecting the topic using a machine-learning model based on the at least one of the one or more second text items. In some embodiments, the section includes a segment summary and the topic includes a segment title. In certain embodiments, the live summary includes a plurality of topics and a plurality of sections, wherein each topic of the plurality of topics is associated with one of the plurality of sections.

In some embodiments, the plurality of topics and the plurality of sections are organized in the live summary in an order of priority. In certain embodiments, the updating the live summary of the meeting includes: determining a change to an importance of one of the plurality of topics; and reorganizing the plurality of topics and the plurality of sections. In some embodiments, the operations further comprise: transmitting the first version of the live summary to a computing device while the meeting occurs at a first time; and transmitting the second version of the live summary to the computing device while the meeting occurs at a second time, the second time being subsequent to the first time. In certain embodiments, the transmitting the second version of the live summary to the computing device includes: determining an incremental change between the first version of the live summary and the second version of the live summary; and transmitting the incremental change to the computing device. In certain embodiments, the second time is associated with when a segment is determined.

In some embodiments, the operations further comprise: transmitting a third version of the live summary to the computing device while the meeting occurs at a third time, the third time being subsequent to the second time; wherein a first time difference between the first time and the second time is equal to a second time difference between the second time and the third time. In certain embodiments, at least one of the one or more text items include a time indication. In some embodiments, the generating a first version of a live summary includes generating the first version of the live summary using a first machine-learning model, wherein the operations further comprise editing the first version of the live summary using a second machine-learning model, wherein the first machine-learning model is different from the second machine-learning model. In certain embodiments, the operations further comprise: summarizing media data used in the meeting into a summarized media data, the summarized media data being shorter than the media data.

According to certain embodiments, a non-transitory computer-readable medium storing instructions for generating a live summary for a meeting, the instructions upon execution by one or more processors of a computing system, cause the computing system to perform one or more operations comprising: obtaining a first set of audio data associated with the meeting while the meeting occurs; transcribing the first set of audio data into a first set of text data while the meeting occurs; generating a first version of a live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data. For example, the non-transitory computer-readable medium is implemented according to at least FIG. 1, FIG. 2, FIG. 3, FIG. 4, and/or FIG. 5.

In some embodiments, the one or more text items include at least one selected from a group consisting of one or more action items, one or more description items, one or more question-and-answer sections, and one or more decision items. In certain embodiments, the operations further comprise: segmenting the meeting into one or more segments; for each segment of the one or more segments, generating a segment summary including a segment title and one or more segment text items, the segment summary being a part of the live summary. In some embodiments, the segmenting the meeting into one or more segments includes segmenting the meeting into the one or more segments based on at least one selected from a group consisting of a segment duration, a topic change, context information, and a speaker change. In certain embodiments, the generating a segment summary includes generating a first segment summary in a first level of granularity and generating a second segment summary in a second level of granularity, wherein the first level of granularity higher than the second level of granularity, wherein the first segment summary is shorter than the second segment summary.

In some embodiments, the updating the live summary of the meeting includes updating the live summary of the meeting when a subsequent segment of the meeting is determined. In certain embodiments, the updating the live summary of the meeting includes: generating one or more second text items based at least in part on the second set of audio data; adding the one or more second text items to the second version of the live summary. In some embodiments, the adding the one or more second text items to the live summary includes inserting at least one of the one or more second text items in a section under a topic in the second version of the live summary. In certain embodiments, the operations further comprise: selecting the topic using a machine-learning model based on the at least one of the one or more second text items. In some embodiments, the section includes a segment summary and the topic includes a segment title. In certain embodiments, the live summary includes a plurality of topics and a plurality of sections, wherein each topic of the plurality of topics is associated with one of the plurality of sections.

In some embodiments, the plurality of topics and the plurality of sections are organized in the live summary in an order of priority. In certain embodiments, the updating the live summary of the meeting includes: determining a change to an importance of one of the plurality of topics; and reorganizing the plurality of topics and the plurality of sections. In some embodiments, the operations further comprise: transmitting the first version of the live summary to a computing device while the meeting occurs at a first time; and transmitting the second version of the live summary to the computing device while the meeting occurs at a second time, the second time being subsequent to the first time. In certain embodiments, the transmitting the second version of the live summary to the computing device includes: determining an incremental change between the first version of the live summary and the second version of the live summary; and transmitting the incremental change to the computing device. In certain embodiments, the second time is associated with when a segment is determined.

In some embodiments, the operations further comprise: transmitting a third version of the live summary to the computing device while the meeting occurs at a third time, the third time being subsequent to the second time; wherein a first time difference between the first time and the second time is equal to a second time difference between the second time and the third time. In certain embodiments, at least one of the one or more text items include a time indication. In some embodiments, the generating a first version of a live summary includes generating the first version of the live summary using a first machine-learning model, wherein the operations further comprise editing the first version of the live summary using a second machine-learning model, wherein the first machine-learning model is different from the second machine-learning model. In certain embodiments, the operations further comprise: summarizing media data used in the meeting into a summarized media data, the summarized media data being shorter than the media data.

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., SSD, RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for generating a live summary for a meeting, the method comprising:
    obtaining, via a virtual participant of the meeting, a first set of audio data associated with the meeting while the meeting occurs, the virtual participant configured to provide a transcript of the meeting in real time;
    transcribing, via the virtual participant, the first set of audio data into a first set of text data while the meeting occurs;
    generating, via the virtual participant, a first version of the live summary of the meeting based at least in part on the first set of text data, the live summary including one or more text items;
    updating the live summary of the meeting to a second version of the live summary based at least in part on a second set of audio data, wherein the second set of audio data is subsequent to the first set of audio data;
    segmenting the meeting into one or more segments; and
    for each segment of the one or more segments, generating a segment summary including a segment title and one or more segment text items, the segment summary being a part of the live summary;
    wherein the updating the live summary of the meeting includes updating the live summary of the meeting when a subsequent segment of the meeting is occurring;
    wherein the generating a segment summary includes generating a first segment summary in a first level of granularity and generating a second segment summary in a second level of granularity, wherein the first level of granularity is higher than the second level of granularity, wherein the first segment summary is shorter than the second segment summary.

2. The computer-implemented method of claim 1, wherein the segmenting the meeting into one or more segments includes segmenting the meeting into the one or more segments based on at least one selected from a group consisting of a segment duration, a topic change, context information, and a speaker change.

3. A computing system for generating a live summary for a meeting, the computing system comprising:
    one or more memories including instructions stored thereon; and
    one or more processors configured to execute the instructions and perform operations comprising:
        obtaining, via a virtual participant of the meeting, a first set of audio data associated with the meeting while the meeting occurs, the virtual participant configured to provide a transcript of the meeting in real time;
        transcribing the first set of audio data into a first set of text data while the meeting occurs;
        generating a first version of the live summary of the meeting based at least in part on the first set of text data, the live summary including one or more text items; and
        updating the live summary of the meeting to a second version of the live summary based at least in part on a second set of audio data, wherein the second set of audio data is subsequent to the first set of audio data;
    wherein the updating the live summary of the meeting includes updating the live summary of the meeting when a subsequent segment of the meeting is occurring;
    wherein the operations further comprise:
        segmenting the meeting into one or more segments; and
        for each segment of the one or more segments, generating a segment summary including a segment title and one or more segment text items, the segment summary being a part of the live summary;
    wherein the generating a segment summary includes generating a first segment summary in a first level of granularity and generating a second segment summary in a second level of granularity, wherein the first level of granularity is higher than the second level of granularity, wherein the first segment summary is shorter than the second segment summary.

4. The computing system of claim 3, wherein the one or more text items include at least one selected from a group consisting of one or more action items, one or more description items, one or more question-and-answer sections, and one or more decision items.

5. The computing system of claim 3, wherein the segmenting the meeting into one or more segments includes segmenting the meeting into the one or more segments based on at least one selected from a group consisting of a segment duration, a topic change, context information, and a speaker change.

6. A computer-implemented method for generating a live summary for a meeting, the method comprising:
    obtaining, via a virtual participant of the meeting, a first set of audio data associated with the meeting while the meeting occurs, the virtual participant configured to provide a transcript of the meeting in real time;
    transcribing, via the virtual participant, the first set of audio data into a first set of text data while the meeting occurs;
    generating, via the virtual participant, a first version of the live summary of the meeting based at least in part on the first set of text data, the live summary including one or more text items, wherein the generating a first version of the live summary includes generating the first version of the live summary using a first machine-learning model;
    editing the first version of the live summary using a second machine-learning model, wherein the first machine-learning model is different from the second machine-learning model; and
    updating the live summary of the meeting to a second version of the live summary based at least in part on a second set of audio data, wherein the second set of audio data is subsequent to the first set of audio data;
    wherein the updating the live summary of the meeting includes updating the live summary of the meeting when a subsequent segment of the meeting is occurring.

7. A computing system for generating a live summary for a meeting, the computing system comprising:
    one or more memories including instructions stored thereon; and
    one or more processors configured to execute the instructions and perform operations comprising:
        obtaining, via a virtual participant of the meeting, a first set of audio data associated with the meeting while the meeting occurs, the virtual participant configured to provide transcript of the meeting in real time;

transcribing the first set of audio data into a first set of text data while the meeting occurs;

generating a first version of the live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data;

wherein the updating the live summary of the meeting includes updating the live summary of the meeting when a subsequent segment of the meeting is occurring;

wherein the updating the live summary of the meeting includes:

generating one or more second text items based at least in part on the second set of audio data; and adding the one or more second text items to the second version of the live summary;

wherein the adding the one or more second text items to the second version of the live summary includes inserting at least one of the one or more second text items in a section under a topic in the second version of the live summary.

8. The computing system of claim 7, wherein the operations further comprise:

selecting the topic using a machine-learning model based on the at least one of the one or more second text items.

9. A computer-implemented method for generating a live summary for a meeting, the method comprising:

obtaining, via a virtual participant of the meeting, a first set of audio data associated with the meeting while the meeting occurs, the virtual participant configured to provide a transcript of the meeting in real time;

transcribing, via the virtual participant, the first set of audio data into a first set of text data while the meeting occurs;

generating, via the virtual participant, a first version of the live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data;

wherein the updating the live summary of the meeting includes updating the live summary of the meeting when a subsequent segment of the meeting is occurring;

wherein the updating the live summary of the meeting includes:

generating one or more second text items based at least in part on the second set of audio data; and adding the one or more second text items to the second version of the live summary;

wherein the adding the one or more second text items to the second version of the live summary includes inserting at least one of the one or more second text items in a section under a topic in the second version of the live summary.

10. The computer-implemented method of claim 9, further comprising:

selecting the topic using a machine-learning model based on the at least one of the one or more second text items.

11. The computer-implemented method of claim 9, wherein the section includes a segment summary and the topic includes a segment title.

12. A computer-implemented method for generating a live summary for a meeting, the method comprising:

obtaining, via a virtual participant of the meeting, a first set of audio data associated with the meeting while the meeting occurs, the virtual participant configured to provide a transcript of the meeting in real time;

transcribing, via the virtual participant, the first set of audio data into a first set of text data while the meeting occurs;

generating, via the virtual participant, a first version of the live summary of the meeting based at least in part on the first set of text data, the live summary including one or more text items; and updating the live summary of the meeting to a second version of the live summary based at least in part on a second set of audio data, wherein the second set of audio data is subsequent to the first set of audio data;

wherein the updating the live summary of the meeting includes updating the live summary of the meeting when a subsequent segment of the meeting is occurring;

wherein the live summary includes a plurality of topics and a plurality of sections, wherein each topic of the plurality of topics is associated with one of the plurality of sections;

wherein the plurality of topics and the plurality of sections are organized in the live summary in an order of priority.

13. The computer-implemented method of claim 12, wherein the updating the live summary of the meeting includes:

determining a change to an importance of one of the plurality of topics; and reorganizing the plurality of topics and the plurality of sections.

14. A computer-implemented method for generating a live summary for a meeting, the method comprising:

obtaining, via a virtual participant of the meeting, a first set of audio data associated with the meeting while the meeting occurs, the virtual participant configured to provide a transcript of the meeting in real time;

transcribing, via the virtual participant, the first set of audio data into a first set of text data while the meeting occurs;

generating, via the virtual participant, a first version of the live summary of the meeting based at least in part on the first set of text data, the live summary including one or more text items;

updating the live summary of the meeting to a second version of the live summary based at least in part on a second set of audio data, wherein the second set of audio data is subsequent to the first set of audio data;

transmitting the first version of the live summary to a computing device while the meeting occurs at a first time; and transmitting the second version of the live summary to the computing device while the meeting occurs at a second time, the second time being subsequent to the first time;

wherein the updating the live summary of the meeting includes updating the live summary of the meeting when a subsequent segment of the meeting is occurring.

15. The computer-implemented method of claim 14, wherein the one or more text items include at least one selected from a group consisting of one or more action items, one or more description items, one or more question-and-answer sections, and one or more decision items.

16. The computer-implemented method of claim 14, wherein the transmitting the second version of the live summary to the computing device includes:
   determining an incremental change between the first version of the live summary and the second version of the live summary; and
   transmitting the incremental change to the computing device.

17. The computer-implemented method of claim 14, wherein the second time is associated with when a segment is determined.

18. The computer-implemented method of claim 14, further comprising:
   transmitting a third version of the live summary to the computing device while the meeting occurs at a third time, the third time being subsequent to the second time;
   wherein a first time difference between the first time and the second time is equal to a second time difference between the second time and the third time.

19. The computer-implemented method of claim 14, wherein at least one of the one or more text items includes a time indication.

20. The computer-implemented method of claim 14, further comprising:
   summarizing meeting media data used in the meeting into summarized media data, the summarized media data being shorter than the meeting media data.

\* \* \* \* \*